(12) United States Patent
Knoblauch

(10) Patent No.: US 9,457,658 B2
(45) Date of Patent: Oct. 4, 2016

(54) DRIVE TRAIN OF A PURELY ELECTRICALLY ALL-WHEEL DRIVABLE MOTOR VEHICLE

(71) Applicant: Dr. Ing. h.c. F. Porsche Aktiengesellschaft, Stuttgart (DE)

(72) Inventor: Daniel Knoblauch, Obergruppenbach (DE)

(73) Assignee: Dr. Ing. h.c.F. Posche Aktiengesellschaft (DE)

( * ) Notice: Subject to any disclaimer, the term of this patent is extended or adjusted under 35 U.S.C. 154(b) by 78 days.

(21) Appl. No.: 14/363,066

(22) PCT Filed: Oct. 29, 2012

(86) PCT No.: PCT/EP2012/004519
§ 371 (c)(1),
(2) Date: Jun. 5, 2014

(87) PCT Pub. No.: WO2013/083220
PCT Pub. Date: Jun. 13, 2013

(65) Prior Publication Data
US 2015/0306955 A1     Oct. 29, 2015

(30) Foreign Application Priority Data

Dec. 5, 2011    (DE) .................. 10 2011 056 048

(51) Int. Cl.
*B60K 17/356*    (2006.01)
*B60K 1/02*    (2006.01)
(Continued)

(52) U.S. Cl.
CPC .............. *B60K 17/356* (2013.01); *B60K 1/02* (2013.01); *B60K 17/344* (2013.01);
(Continued)

(58) Field of Classification Search
CPC .... B60K 17/356; B60K 17/344; B60K 1/02; B60K 17/165; B60K 17/35; B60K 2001/001
USPC .......... 180/65.1, 65.6, 69.6, 242, 243; 477/3
See application file for complete search history.

(56) References Cited

U.S. PATENT DOCUMENTS

| 1,661,780 A | * | 3/1928 | Warhus | ..................... B60K 1/02 |
| | | | | 180/65.6 |
| 1,851,068 A | * | 3/1932 | Swabb | ..................... B61C 5/00 |
| | | | | 105/118 |

(Continued)

FOREIGN PATENT DOCUMENTS

CN         200984963 Y    12/2007

OTHER PUBLICATIONS

International Search Report of May 3, 2013.

(Continued)

*Primary Examiner* — Anne Marie Boehler
(74) *Attorney, Agent, or Firm* — Gerald E. Hespos; Michael J. Porco; Matthew T. Hespos

(57) ABSTRACT

A drive train (1) of a purely electrically all-wheel drivable motor vehicle, has a first axle (2), a second axle and two electric machines (10) arranged in the direction of travel (3) of the motor vehicle. The first axle (2) can be driven by the electric machines (10) via a transmission (11). The transmission (11) and the first axle (2) are connected to each other by at least one bevel gear toothing (20, 7; 20, 27), and the transmission (11) and a shaft for driving the second axle are connected to each other by at least a further toothing (22, 23; 22, 28). In this way, an all-wheel drive can be achieved with a simple construction by the use of such a drive train in a motor vehicle that is to be operated in a purely electrical manner.

12 Claims, 1 Drawing Sheet

(51) Int. Cl.
*B60K 17/344* (2006.01)
*B60L 11/18* (2006.01)
*B60L 15/20* (2006.01)

(52) U.S. Cl.
CPC ....... *B60L 11/1803* (2013.01); *B60L 15/2036* (2013.01); *B60L 15/2054* (2013.01); *B60L 2220/12* (2013.01); *B60L 2220/14* (2013.01); *B60L 2220/46* (2013.01); *B60L 2240/421* (2013.01); *B60L 2240/423* (2013.01); *B60L 2240/486* (2013.01); *B60L 2260/28* (2013.01); *B60Y 2200/91* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | | | |
|---|---|---|---|---|
| 4,270,622 A | * | 6/1981 | Travis | B60K 1/02 180/65.285 |
| 6,276,474 B1 | * | 8/2001 | Ruppert | B60K 1/02 180/292 |
| 6,615,946 B2 | | 9/2003 | Pasquini et al. | |
| 6,708,788 B2 | * | 3/2004 | Kuwayama | B60K 1/02 180/65.6 |
| 6,886,647 B1 | * | 5/2005 | Gotta | B60K 1/02 180/65.1 |
| 2002/0074177 A1 | | 6/2002 | Pasquini | |
| 2005/0023885 A1 | | 2/2005 | Bennett | |
| 2005/0067199 A1 | * | 3/2005 | Shimizu | B60L 15/2045 180/65.1 |
| 2011/0259657 A1 | * | 10/2011 | Fuechtner | B60K 6/52 180/65.21 |
| 2014/0332301 A1 | * | 11/2014 | Knoblauch | B60K 1/00 180/248 |

OTHER PUBLICATIONS

German Search Report of Aug. 16, 2012.
Chinese Office Action Dated June 22,2016.

* cited by examiner

DRIVE TRAIN OF A PURELY ELECTRICALLY ALL-WHEEL DRIVABLE MOTOR VEHICLE

BACKGROUND

1. Field of the Invention

The invention relates to a drive train of a purely electrically all-wheel drivable motor vehicle, with a first and a second axle, and with two electric machines arranged in the direction of travel of the motor vehicle, wherein the first axle is drivable by means of the electric machines via a gearing.

2. Description of the Related Art

Such a drive train, which is used for an electrically drivable earth-moving vehicle or for an agricultural vehicle with four-wheel drive, is known from DE 600 13 340 T2. Said drive train has two electric machines which are arranged in the direction of travel above the one, rear axle and interact with a spur gearing which is arranged in front of the rear axle. The gearing is connected via one shaft or two shafts to the differentials which are assigned to the two axles, therefore to the rear axle and to the front axle.

It is the object of the present invention to provide a drive train in a motor vehicle to be operated purely electrically, by means of which drive train an all-wheel drive can be produced with structurally simple means.

SUMMARY OF THE INVENTION

The drive train of the purely electrically all-wheel drivable motor vehicle therefore has a first and a second axle and two electric machines arranged in the direction of travel of the motor vehicle. The first axle here is drivable by means of the electric machines via a gearing. It is essential that the gearing and the first axle are connected to each other by means of at least one bevel gear toothing, and the gearing and a shaft for driving the second axle are connected to each other by means of at least one further toothing. The at least one bevel gear toothing therefore serves for transmitting the torque of the electric machines, which are arranged in the direction of travel, to the first axle, which is arranged transversely with respect to the direction of travel. In addition to this first axle, the gearing also drives the shaft, which is, in particular, a propeller or cardan shaft, wherein said shaft is connected to the second axle of the vehicle in order also to drive said axle.

Owing to this design in the region of the first axle and the electric machines and the gearing located in between, the drive train can be of very compact design.

The drive train is preferably used in a motor vehicle which is in the form of a passenger vehicle. Said passenger vehicle is in particular a sports car. Said motor vehicle, in particular the passenger vehicle or the sports car, is preferably in the form of rear drive. The electric machines are therefore arranged in the rear region of the motor vehicle or of the drive train. The electric machines are therefore located in the vicinity of the first, rear axle. In particular, provision is made for said axle to be located in front of the electric machines.

In principle, however, the motor vehicle may be in the form of a front drive. In this case, the electric machines are therefore located in the region of the second, front axle of the drive train, in particular in front of said axle.

The wheels assigned to the drive train are connected thereto in particular individually via propeller shafts. In this case, the drive train does not have rigid axles.

It is considered to be particularly advantageous if the two electric machines are connected to each other via a constant transmission ratio.

In one advantageous alternative, it is provided that one shaft of the gearing is drivable by means of the two electric machines, and a bevel gear toothing has a pinion and a crown wheel, wherein the pinion is connected to said gearing shaft and a differential of the first axle is drivable by means of the crown wheel.

Furthermore, it is advantageous if one shaft of the gearing is drivable by means of the two electric machines, wherein a spur gear which is connected to said gearing shaft meshes with a spur gear which is connected to another shaft of the gearing, wherein said other gearing shaft is connected to the shaft for driving the second axle.

The two electric machines are therefore in particular connected to each other via a constant transmission ratio and jointly drive the pinion, which drives the differential of the first axle via the crown wheel. By means of a gear wheel, in particular a spur gear on the pinion shaft, the shaft, which is in particular designed as a cardan shaft, is then driven via a gear wheel, in particular a spur gear.

In another advantageous alternative, it is provided that the gearing has two output shafts, wherein each output shaft is drivable by means of one of the electric machines, and each output shaft is connected to a common differential via a respective gear wheel, wherein the output of the differential is connected to the shaft for driving the second axle. In this alternative, two bevel gear toothings which each have a pinion and a crown wheel are in particular provided, wherein the respective pinion is connected to one of the two output shafts and the respective crown wheel is connected to a respective axle half of the first axle.

According to this other alternative, the gearing therefore has two separate pinions which drive the left or right axle half of the first axle, therefore the left or right wheel of the first axle, via a respective crown wheel. The two pinion shafts are connected via a respective gear wheel to a common differential, in order to introduce torque into the shaft, in particular the cardan shaft, which is connected to the second axle.

It is considered to be particularly expedient if, in the drive train, the gearing is designed as a spur gearing apart from the output gear wheel of the gearing, which output gear wheel is designed as a bevel gear, or apart from the output gear wheels of the gearing, which output gear wheels are designed as bevel gears.

According to a preferred development of the invention, it is provided that, in the drive train, the two electric machines are synchronous machines or asynchronous machines, or the one electric machine is a synchronous machine and the other electric machine is an asynchronous machine. When the vehicle is operated, one electric machine can be shut off. In particular, one asynchronous machine is shut off because said asynchronous machine can then continue to operate without magnetic resistance. Accordingly, said electric machine does not need to be decoupled. In principle, however, it is also entirely possible for an electric machine in the form of a synchronous machine to be switched off. When the one electric machine is switched off, the drive train is acted upon by the other electric machine, and therefore the wheels of the rear and front axles are driven via said one electric machine which is in operation.

Further features of the invention emerge from the dependent claims, the attached drawing and the description of the preferred exemplary embodiments, which are reproduced in the drawing, without being limited thereto.

DETAILED DESCRIPTION OF THE PREFERRED EMBODIMENTS

Figure 1:
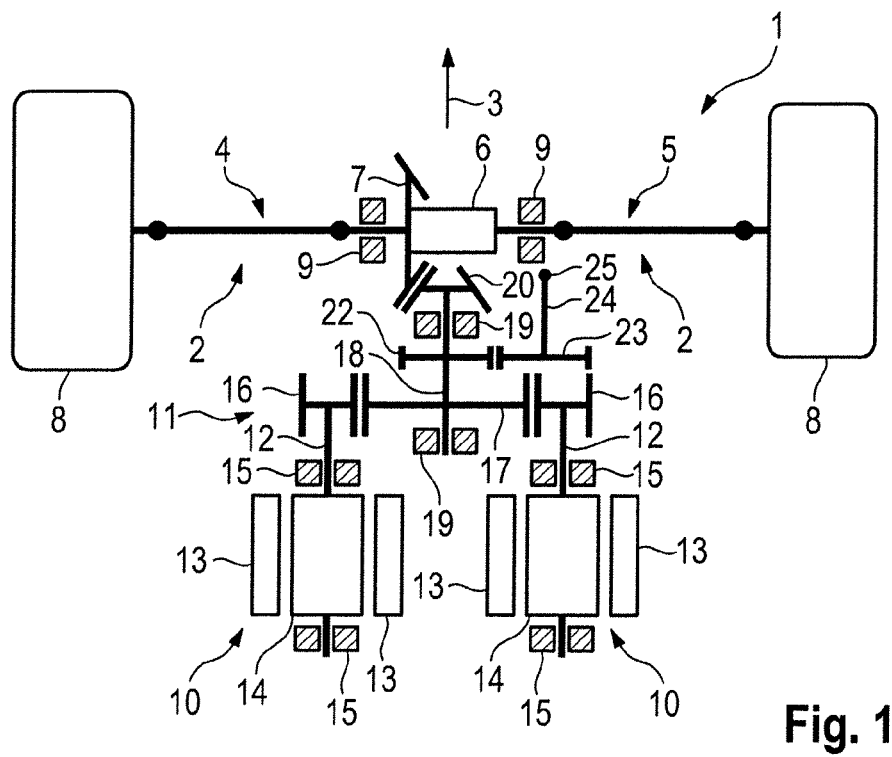
FIG. 1 shows a schematic diagram of a first embodiment of the drive train according to the invention.

The exemplary embodiment according to FIG. 1 illustrates a drive train for a purely electrically drivable motor vehicle, which is in particular a passenger vehicle, specifically a sports car. Only that region of the drive train which is assigned to the rear axle of the motor vehicle is shown in FIG. 1.

The drive train 1 with individual wheel suspension has the first, rear axle 2 and a second, front axle (not illustrated). With regard to the forward direction of travel 3 of the motor vehicle, referred to in short below as direction of travel, the rear axle 2 has a left axle section 4 and a right axle section 5. The two axle sections 4 and 5 are driven by means of a differential 6 of the rear axle 2. The differential 6 has a crown wheel 7. The left and the right wheel of the rear axle 2 are denoted by the reference number 8 and bearings for the axle sections 4 and 5 of the rear axle 2 are denoted by the reference number 9. The axle sections 4 and 5 of the rear axle 2 and also the axle sections of the front axle have propeller shafts.

The rear axle 2 is drivable by means of two electric machines 10 via a gearing 11. In this case, the gearing 11 is arranged behind the rear axle 2, and the two electric machines 10 are arranged behind the gearing 11. The electric machines 10 are both arranged in the direction of travel 3, and the axis of rotation of the respective electric machine 10, illustrated by the driven shaft 12 thereof, is therefore arranged in the direction of travel 3.

The stator of the respective electric machine 10 is denoted by the reference number 13, and the rotor of the respective electric machine 10, to which rotor the driven shaft 12 is connected, is denoted by the reference number 14. The respective driven shaft 12 is mounted in bearings 15.

The gearing 11 is essentially in the form of a spur gearing. A pinion 16 in the form of a spur gear is connected to the respective driven shaft 12 for rotation therewith. The pinions 16 assigned to the two driven shafts 12 of the electric machines 10 mesh with a common spur gear 17 of the gearing 1, which spur gear is connected to a shaft 18. Said shaft 18 is mounted in bearings 19. A pinion 20 in the form of a bevel gear is connected to the shaft 18 extending in the direction of travel 3, in the region of the front end of said shaft. Said pinion meshes with the crown wheel 7 and therefore forms a bevel gear toothing therewith. Accordingly, the pinion 20 is drivable via the electric machines 10 and the crown wheel 7 is drivable via said pinion, wherein said crown wheel drives the differential 6 of the rear axle 2, and therefore the two rear wheels 8 are driven via the axle sections 4 and 5.

The shaft 18 of the gearing 1 is connected to a further spur gear 22 between the spur gear 17 and the pinion 20. Said spur gear 22 meshes with a spur gear 23 of the gearing 11, which spur gear is connected to a shaft 24, the end of which averted from the spur gear 23 serves as a connection for a shaft (not illustrated), in particular a cardan shaft. Via said cardan shaft, which reaches forward from the region of the rear axle 2 into the region of the front axle of the drive train, the two electric machines 10 are connected in terms of torque to the front axle of the drive train. Said connection between the connection point 25 of the shaft 24 and the front axle can take place in a manner generally known from the prior art wherein it is entirely possible for a controllable clutch, in particular a hang-on clutch, to be assigned to the shaft or cardan shaft.

The exemplary embodiment according to FIG. 1 therefore illustrates the design of the drive train 1 of a purely electrically all-wheel drivable motor vehicle, in which the two electric machines 10 are connected to each other via a constant transmission ratio and jointly drive the pinion 20, which drives the differential 6 of the rear axle 2 via the crown wheel 7. By means of the gear wheel 22 on the pinion shaft 18, the (cardan) shaft and therefore the front axle are driven via the gear wheel 23.

Figure 2:
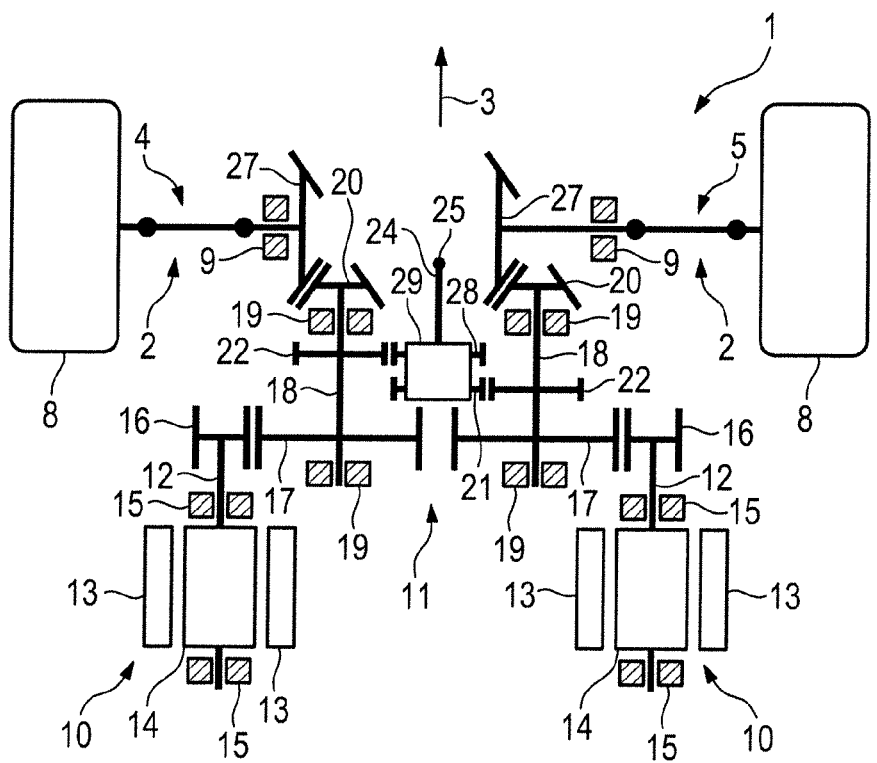
FIG. 2 shows a schematic diagram of a second embodiment of the drive train according to the invention.

In the embodiment of the drive train 1 according to FIG. 2, components, the construction of which or the function of which correspond to those of the embodiment according to FIG. 1, are denoted by the same reference numbers for the sake of simplicity.

The drive train 1 as per the embodiment according to FIG. 2 differs from the drive train 1 as per the embodiment according to FIG. 1 essentially in that, in the embodiment according to FIG. 2, two shafts 18 which are arranged parallel and in the direction of travel 3 of the motor vehicle are provided. Each shaft 18 has the spur gear 17, the spur gear 22 and the pinion 20. Accordingly, the one electric machine 10 drives the one shaft 18 via the pinion 16 assigned to said one electric machine, and the other electric machine 10 drives the other shaft 18 via the pinion 16 assigned to said other electric machine. Given an identical speed of rotation of the electric machines, the one shaft 18 is driven at the same speed of rotation as the other shaft 18. The pinion 20 of the respective shaft 18 meshes with a crown wheel 27, which is connected to the left axle section 4 or the right axle section 5. In this design of the drive train, the rear wheels 8 are driven individually, and, accordingly, electric torque vectoring is possible by means of different torques of the electric machines 10.

In order to connect the two electric machines 10 frictionally to the front axle (not illustrated) of the drive train 1, the two spur gears 22 of the two shafts 18, which are each arranged between the spur gear 17 and the pinion 20, mesh with spur gears 21 and 28 of a planetary differential 29, wherein an output of the differential 29, illustrated by the connection point 25, is connected to a shaft (not illustrated), in particular a cardan shaft, via which the front axle of the drive train 1 is driven.

According to this embodiment, the gearing 1 therefore has two separate pinions 20 which drive the left and right wheel 8 of the rear axle 2 via a respective crown wheel 27. The two pinion shafts 18 are connected to a common differential 29 via a respective gear wheel 22, in order to introduce torque into the (cardan) shaft.

In the case of the two electric machines 10 of the exemplary embodiment according to FIG. 1, the one electric machine 10 can be a synchronous machine and the other electric machine 10 can be an asynchronous machine. In particular, the asynchronous machine is suitable for operation of the vehicle with only one electric machine 10, wherein the other electric machine 10, the synchronous machine, is switched off. It can continue to operate without magnetic resistance.

The invention claimed is:

1. A drive train of a purely electrically all-wheel drivable motor vehicle, comprising a first axle and a second axle spaced apart along a direction of travel of the motor vehicle, and two electric machines arranged laterally of one another and each having a driven shaft aligned in the direction of travel of the motor vehicle, the two electric machines further being disposed so that the first axle is between the second axle and the electric machines, the first axle being drivable by the electric machines via a gearing, the gearing having a first shaft that is drivable by the two electric machines, a first spur gear and at least one bevel gear toothing being connected to the first shaft, the gearing and the first axle being connected to each other by the at least one bevel gear toothing, and the gearing and a second shaft for driving the second axle being connected to each other by the first spur gear on the first shaft meshing with a second spur gear on the second shaft.

2. The drive train of claim 1, wherein the first axle is a rear axle of the motor vehicle.

3. The drive train of claim 2, wherein the electric machines are arranged behind the rear axle.

4. The drive train of claim 1, wherein the drive train is a drive train of a sports car.

5. The drive train of claim 1, wherein the electric machines are connected to each other via a constant transmission ratio or a switching mechanism.

6. The drive train of claim 1, wherein the bevel gear toothing has a pinion and a crown wheel, the pinion being connected to said gearing shaft and a differential of the first axle being drivable by the crown wheel.

7. The drive train of claim 1, wherein the shaft for driving the second axle is a cardan shaft.

8. The drive train of claim 1, wherein the two electric machines are synchronous machines or asynchronous machines, or the one electric machine is a synchronous machine and the other electric machine is an asynchronous machine.

9. The drive train of claim 1, wherein the driven shafts of the two electric machines are parallel to one another and laterally spaced.

10. The drive train of claim 9, wherein the driven shafts of the two electric machines are parallel to the first and second shafts.

11. The drive train of claim 9, wherein rotational axes of the driven shafts of the two electric machines are on opposite sides of a rotational axis of the first shaft.

12. The drive train of claim 1, wherein the driven shafts of the electric machines extend from the respective electric machine toward the second axle.

* * * * *